(12) United States Patent
Yao

(10) Patent No.: US 6,390,218 B1
(45) Date of Patent: May 21, 2002

(54) BRAKE PEDAL UNIT FOR A SADDLE RIDING TYPE VEHICLE

(75) Inventor: Hiroto Yao, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 0 days.

(21) Appl. No.: 09/570,792

(22) Filed: May 12, 2000

(30) Foreign Application Priority Data

Jun. 23, 1999 (JP) .............................................. 11-177149

(51) Int. Cl.⁷ .............................. B62J 25/00; G05G 1/14
(52) U.S. Cl. ........................ 180/90.6; 74/512; 74/560; 296/75
(58) Field of Search .......................... 180/90.6; 296/75; 74/512, 560; 188/20, 152, 344

(56) References Cited

U.S. PATENT DOCUMENTS

| 3,086,406 A | * | 4/1963 | Voser | ........................... 74/512 |
| 5,033,267 A | * | 7/1991 | Keane | ........................... 74/512 |
| 5,881,605 A | * | 3/1999 | Doolittle et al. | ............... 74/512 |
| 5,893,424 A | * | 4/1999 | Hisada | ..................... 180/90.6 |
| 6,113,121 A | * | 9/2000 | Mizuta | ........................ 296/75 |

FOREIGN PATENT DOCUMENTS

| JP | 10007067 | 1/1998 |
| JP | 10081280 | 3/1998 |
| JP | 11011371 | 1/1999 |
| JP | 11165679 | 6/1999 |

* cited by examiner

Primary Examiner—Peter C. English
(74) Attorney, Agent, or Firm—Darby & Darby

(57) ABSTRACT

A brake arm is formed of a steel pipe and bent upward in its front part to assume a generally L-shaped configuration. A pedal part is welded to the front part of the brake arm. The brake arm is configured so that the upwardly bent portion is expansion formed so as to gradually become thicker toward the upper end and the distal end portion to which the pedal part is welded has a shape similar to but marginally smaller in size than the bottom face of the pedal part.

2 Claims, 6 Drawing Sheets

BRAKE PEDAL UNIT FOR A SADDLE RIDING TYPE VEHICLE

BACKGROUND OF THE INVENTION (1) Field of the Invention

The present invention relates to a brake pedal unit for a saddle riding type vehicle such as a four-wheel drive vehicle for rough terrain, etc.

(2) Description of the Prior Art

Of four-wheel drive vehicles, there is an off-road saddle riding type vehicle, on which a rider straddles the seat mounted on the top of the frame with their feet on the footboards arranged on both sides in the lower portion of the frame and controls the vehicle by gripping the handlebars.

A vehicle of this kind had the pedal part of the brake pedal arranged in the front part of the right footboard, projecting upwards from the footboard. As the rider presses down the brake pedal by the right foot, the vehicle can be slowed or stopped.

Since off-road saddle riding type vehicles travel in rugged terrain, various kinds of foreign bodies such as mud, stones, wood branches, snow, etc. are liable to accumulate on the footboard. In a snow and cold prone area, the accumulated snow may freeze. Therefore, it is necessary for the vehicles of this kind to avoid control deficiency due to the holding of such foreign bodies between the pedal part and the footboard when the rider depresses the brake pedal. Further, since the vehicle is used in rugged terrain, it swings and sways greatly so that the rider's foot may be displaced on the footboard.

For countermeasures against the above difficulties, Japanese Patent Application Laid-Open Hei 10 No. 81280 (prior art 1) discloses a configuration in which a depressed area is formed below and around the pedal part of the brake pedal in the footboard so as to provide a large brake pedal travel. Alternatively, Japanese Patent Application Laid-Open Hei 11 No. 11371 (prior art 2) discloses a configuration in which a partitioning guard projected downwards is arranged in the area near the outer periphery of the underside of the pedal part of the brake pedal.

However, with the saddle riding type vehicle of the above prior art 1, foreign bodies such as mud or stones etc., are liable to collect into the depressed surface below and around the pedal part of the brake pedal in the footboard. Further, once frozen snow builds up, this configuration makes the pressing down of the brake pedal inconvenient. Further, when the foot is liable to slip out of position due to mud, the foot tends to be displaced into the space below the pedal part, causing difficulties in riding.

With the prior art 2, it is more difficult to place the foot because the pedal area is guarded compared to the prior art 1. Further, raised and depressed portions for reinforcement are formed around the window hole that allows the pedal part of the brake pedal to move therethrough, therefore stones are liable to collect into the depressed portions. Since the pedal part of the brake pedal radially protrudes laterally from its arm, the pedal part is liable to hold foreign bodies between the footboard and itself. Moreover, if the partitioning guard arranged below the pedal part of the brake pedal is deformed, it might affect the control of the brake pedal.

SUMMARY OF THE INVENTION

In view of what has been described above, it is therefore an object of the present invention to provide a brake pedal unit for a saddle riding type vehicle which is free from the drawbacks of the space below the brake pedal clogging with foreign bodies and the problem of the rider's foot slipping into the space below the brake pedal.

In order to achieve the-above object, the present invention is configured as follows.

In accordance with the first aspect of the present invention, a brake pedal unit for a saddle riding type vehicle having a plate-like footboard is characterized in that a brake pedal extending from the rear side to the front side of the vehicle comprises: a window hole formed in the footboard; a brake arm axially supported at a rotation center thereof below the footboard by the vehicle so as to move up and down and having a distal part extending forward and curved upward; and a pedal part fixed to the distal end of the brake arm, wherein the distal part of the brake arm with the pedal fixed is projected upward through the window hole so as to allow the pedal part to be stepped on and pressed downwards, wherein the section of the distal end of the brake arm is formed smaller in size than the pedal part; and the section of the portion of the brake arm projected above from the window hole of the footboard has a shape similar to the pedal part.

In accordance with the second aspect of the present invention, the brake pedal unit for a saddle riding-type vehicle having the above first feature is characterized in that the distal part of the brake arm having a similar section to the pedal part is formed tapering from the pedal part downward.

In accordance with the third aspect of the present invention, the brake pedal unit for a saddle riding type vehicle having the above first feature is characterized in that the distal part of the brake arm having a similar section to the pedal part is formed of a main arm body and a separately formed plate part attached to the main arm body.

In the present invention, the arm portion of the brake pedal projected above the footboard has a section similar to, and is equal to or smaller in size compared to, the pedal part fixed to the distal end thereof. Therefore, there is no possibility of a foreign body being held between the ndersurface of the pedal part and the footboard. It is also possible to prevent the foot from slipping into the space below the pedal part, thus making it possible to prevent deficiency in the control of the brake pedal.

Further, since the portion of the brake arm tapering from the joint to the pedal part is expansion formed or formed by joining a plate member to the main arm body, there is no concern that the portion might deform like the partitioning guard that is attached to the conventional brake pedal.

DESCRIPTION OF THE PREFERRED EMBODIMENTS

The embodiments of the present invention will hereinafter be described with reference to FIGS. 1 through 7.

FIGS. 1 to 6 show the first embodiment of the present invention.

Figure 1:
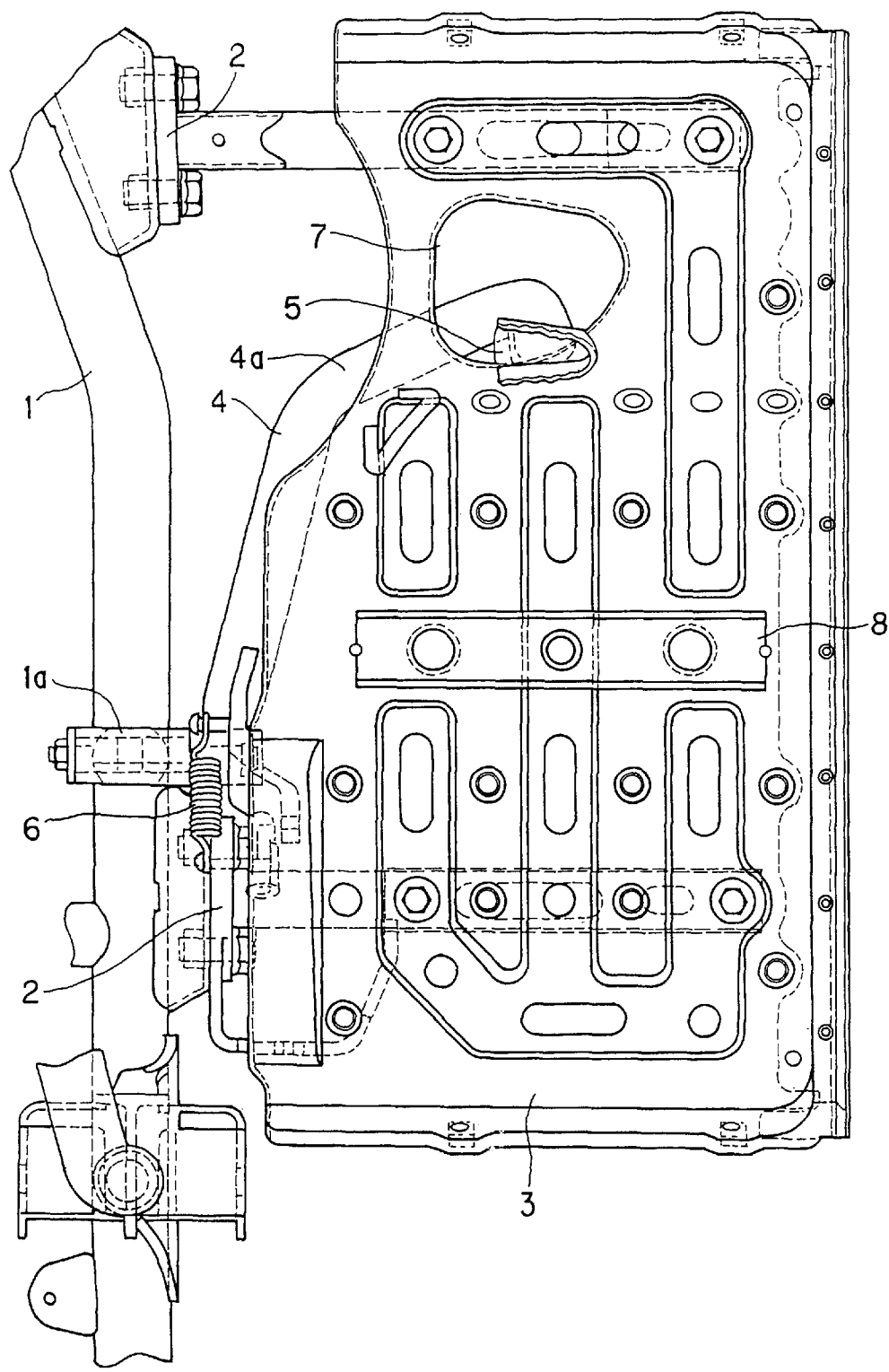
FIG. 1 is a plan view showing a brake pedal unit according to the first embodiment of the present invention.
Figure 2:
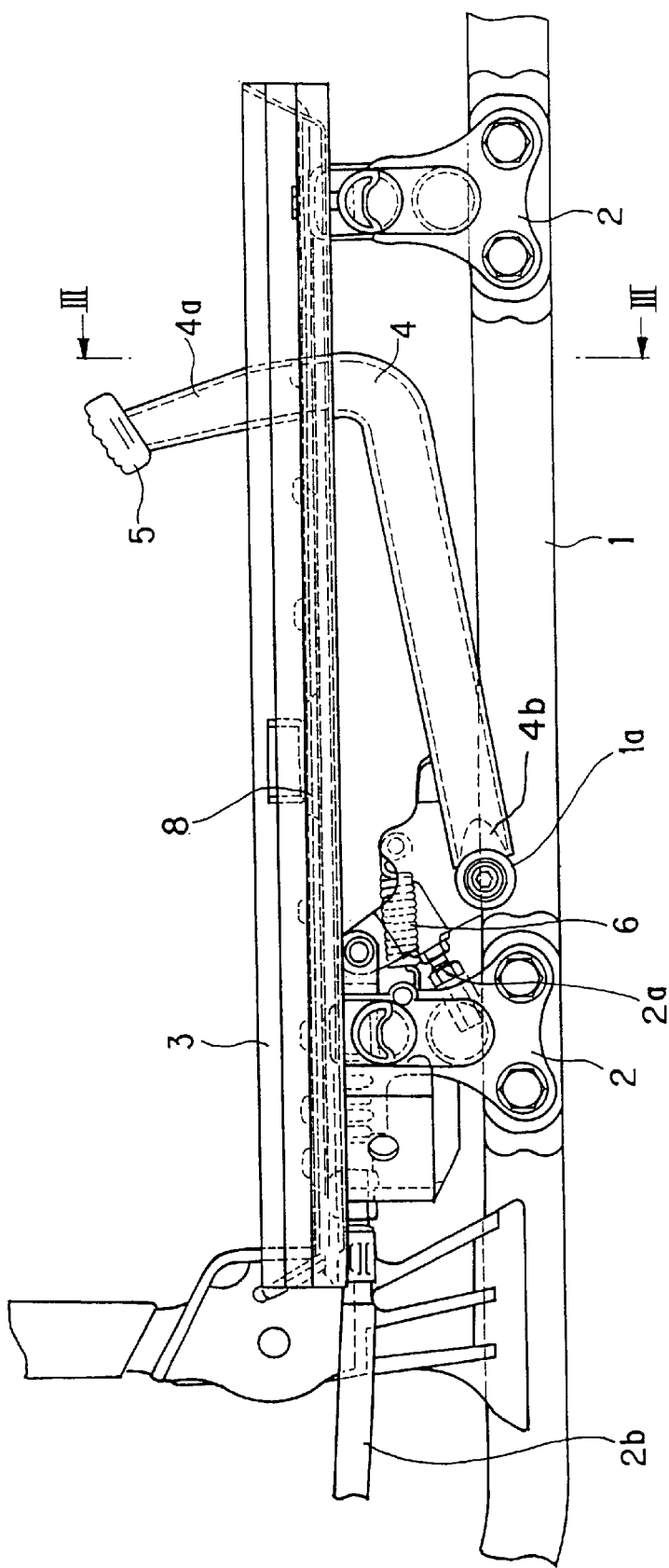
FIG. 2 is a side view showing the brake pedal unit shown in FIG. 1.
Figure 3:
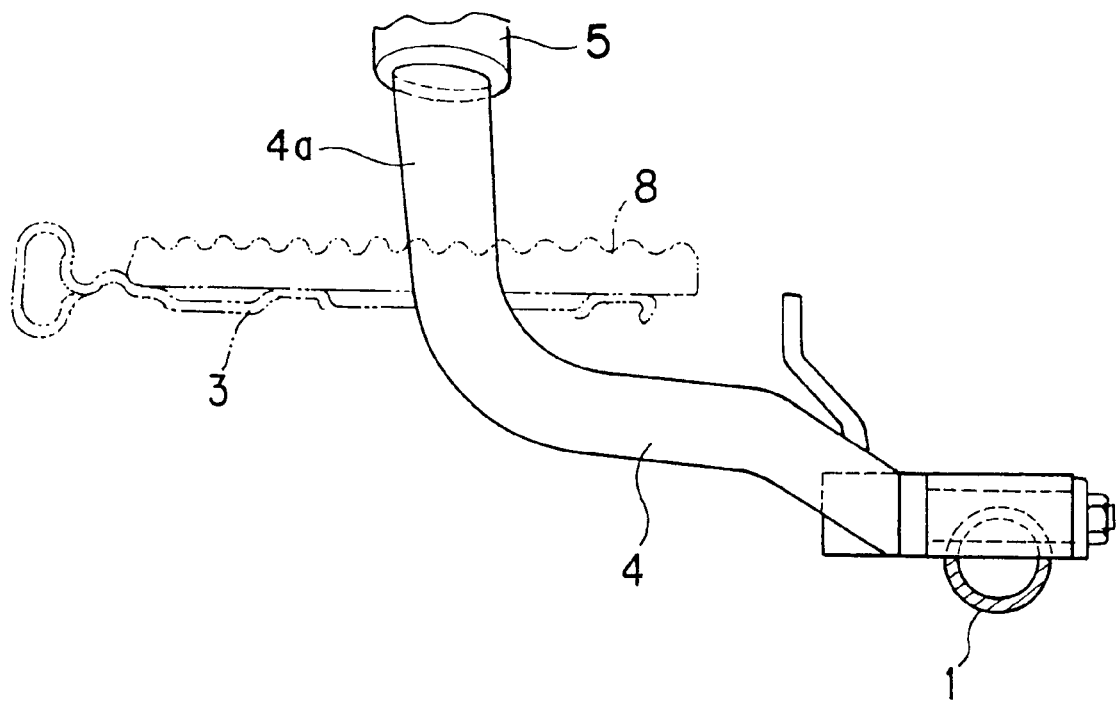
FIG. 3 is a sectional view taken along a plane III—III in FIG. 2.
Figure 4:
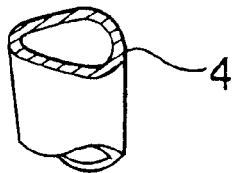
FIG. 4 is a plan view showing the distal part of a brake arm alone in the first embodiment of the present invention.
Figure 5:
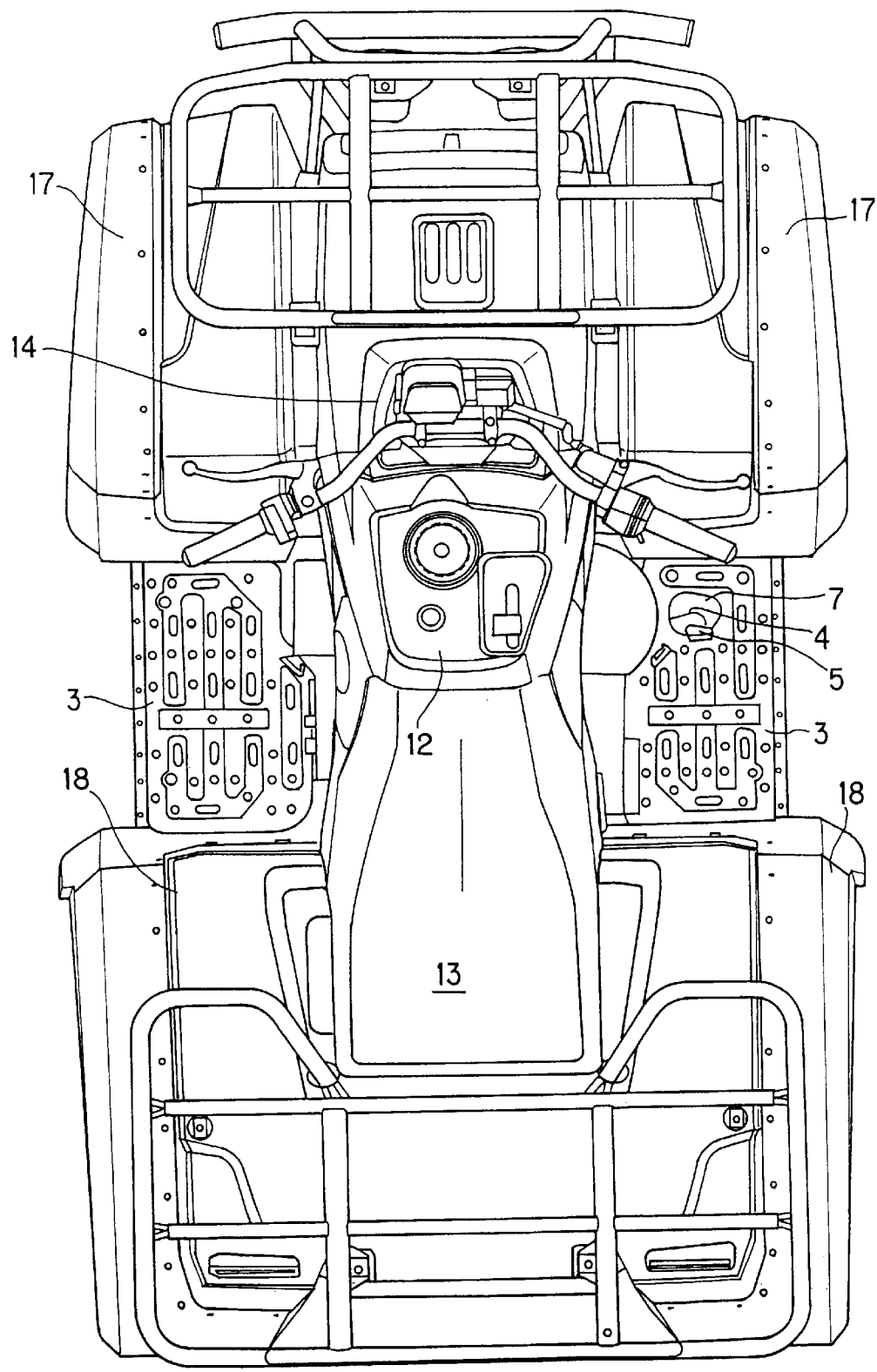
FIG. 5 is a plan view showing the entire vehicle according to the embodiment of the present invention.
Figure 6:
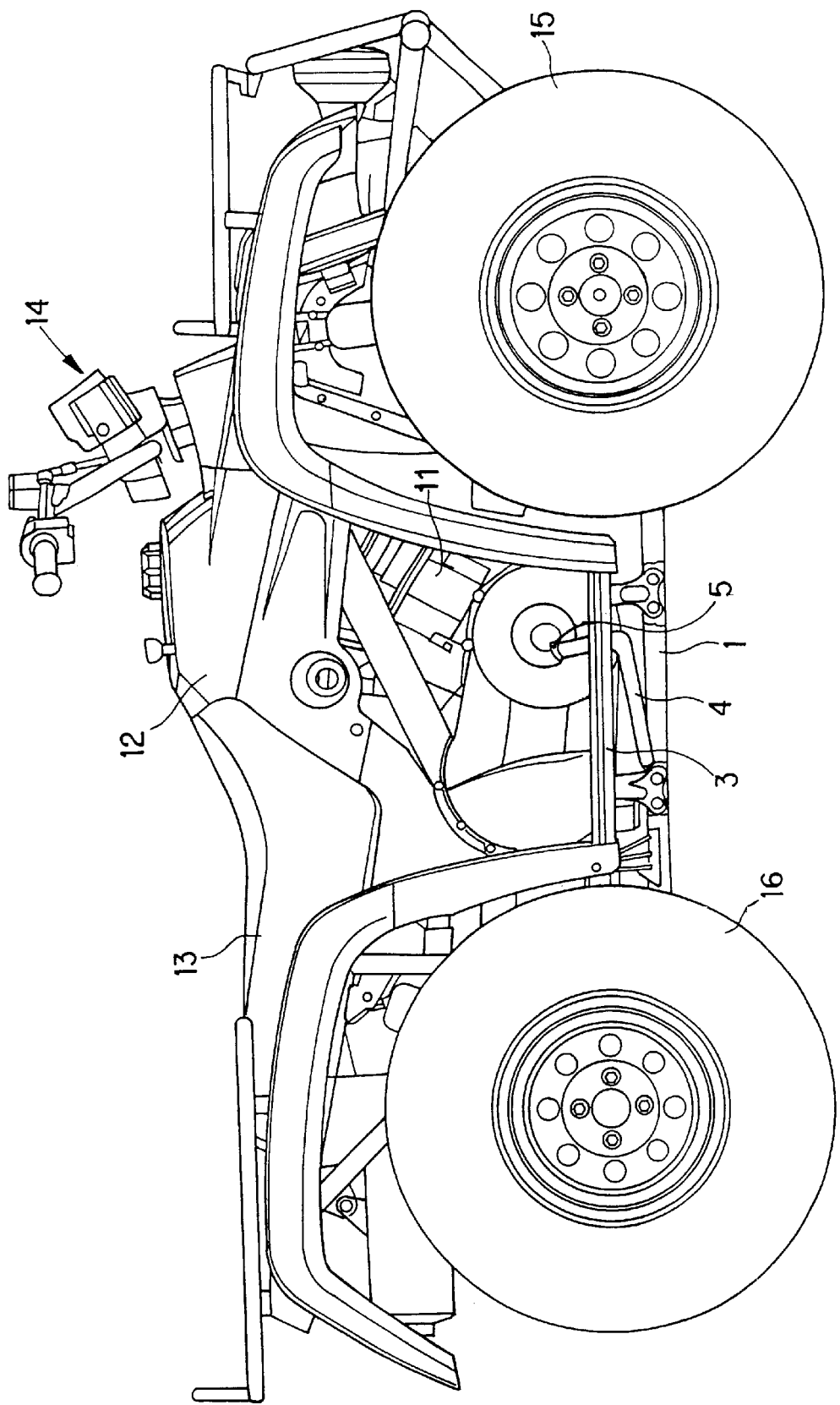
FIG. 6 is a side view showing the entire vehicle according to the embodiment of the present invention.

As shown in FIGS. 5 and 6, in an off-road saddle riding type vehicle in accordance with this embodiment, a pair of lower tubes 1 constituting the vehicle body frame extend along the left and right sides of the vehicle under an engine 11. Provided above engine 11 are a fuel tank 12 and a seat 13. Left and right front wheels 15 are connected to a steering device 14 in front of engine 11 while left and right rear wheels 16 are arranged partially underneath and to the rear of seat 13. These front and rear wheels 15 and 16 are covered from above by fenders 17 and 18.

Each of left and right lower tubes 1 in the frame has front and rear footrest brackets 2, which in turn fasten a footboard 3 which is disposed at a position higher than lower tube 1 and extends sidewards. This footboard 3 is mounted between fenders 17 and 18 covering over front and rear wheels 15 and 16, respectively. Axially fitted to the lower tube 1 on the right side is a rotary proximal end 4b of brake arm 4 by means of a boss 1a.

Brake arm 4 is formed of a steel pipe and bent upward in its front part so as to assume a generally L-shaped configuration. The front part of the brake arm 4 is bent sidewards in the plan view, and has a pedal part 5 having a roughly triangular shape with rounded corners welded at its front end. In brake arm 4, the portion, designated at 4a, which is bent extending upwards, is expansion formed so as to gradually become thicker toward the upper end so that the distal end portion to which pedal part 5 is welded has a shape similar to but marginally smaller in size than the bottom face of pedal part 5.

A return spring 6 is attached at its one end to brake arm 4 while the other end of the spring is fixed at the rear footrest bracket 2, so that pedal part 5 will be pressed down opposing the force of return spring 6 and brake arm 4 and pedal part 5 will revert back to their original position when released.

The upward bent and extended portion 4a of brake arm 4 is projected above through a window hole 7 located at the front portion of footboard 3. Brake arm 4 is configured so as to be angled upward toward the front taking into consideration that arm 4 should project out and downward below frame lower tube 1 as little as possible when arm 4 is pressed down. This contributes to preventing arm 4 from projecting out and downward below the lower tube and interfering with foreign bodies.

Return spring 6 of brake arm 4, a brake stopper 2a and brake cable 2b are all attached to footrest bracket 2 and accommodated under footboard 3 so as to make the rider's foot area tidy.

Footboard 3 is formed flat without any hollows or slits around window hole 7 that allows pedal part 5 and brake arm 4 to pass therethrough so that foreign bodies are hard to be trapped therein. A reinforcement rib is formed at the entire periphery of window hole 7.

The upper surface of footboard 3 is integrally formed with projections and indentations for anti-slipping and a footrest 8 having a U-shaped section is welded to the footboard.

According to this embodiment, when the rider raises the right foot placed on footboard 3 and steps on pedal part 5, the vehicle can be retarded. Since the upward bent and extended portion of brake arm 4 is expansion formed so as to gradually become thicker to be continuous to pedal part 5, there is no risk of foreign bodies clogging the space under pedal part 5 or the foot slipping into the space and being held therein. Thus, this configuration makes it possible to positively, prevent control deficiency of the brake pedal unit as a whole. Further, there is no need to attach a separate guard, so there-is no concern about deformation.

Figure 7:
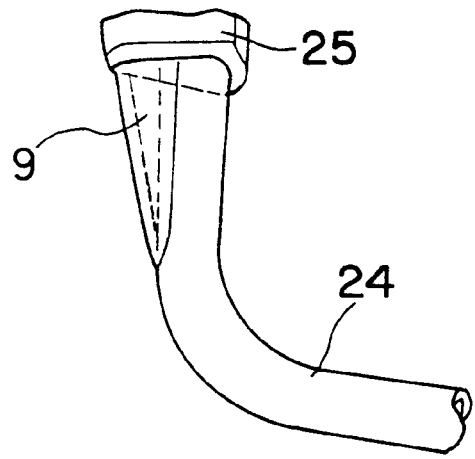
FIG. 7 is a front view showing the front part of a brake arm and a pedal part of a brake pedal according to the second embodiment of the present invention.

FIG. 7 shows the second embodiment of the present invention. In this case, instead of expansion forming the distal part of a brake arm 24 as a preformed member illustrated in the first embodiment 1, the steel pipe is used as it is and a covering side plate 9 is welded to the pipe of brake arm 24. The covering side plate 9 has a partial conical cross-section that is complementary to an outer surface of the pipe of the brake arm 24. The covering side plate 9 is tapered such that a topmost portion which mates with the pedal part 25 has a greater width than a lowermost portion that connects to the pipe of the brake arm 24.

Figure 8:
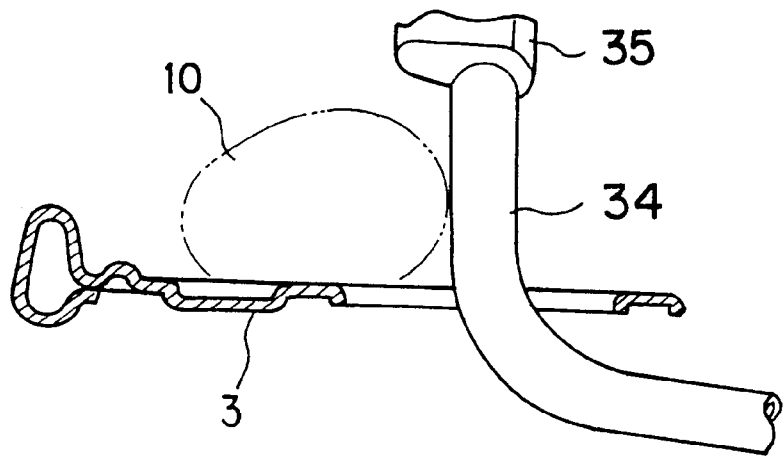
FIG. 8 is an illustrative front view showing a state where a foreign body is held in a stepped portion under the pedal part of the prior art brake pedal.

FIG. 8 shows a comparative state where a foreign body 10 is trapped under a pedal part 35 when pedal part 35 is welded to the distal end of a brake arm 34 of a steel pipe which has not been made thicker, as in the prior art configuration. In the present invention, since the distal end of brake arm 4, 24 is made thicker toward pedal part 5, 25, no such holding of foreign bodies will occur.

As has been described heretofore, since the upward bent and extended part at the distal end part of the brake arm is expanded or formed with a covering side plate so as to gradually thicken to be continuous to pedal part 5, no stepped portion which would hold a foreign body will be formed. Therefore, it is possible to prevent holding of mud and stones and/or a frozen mass of snow etc. under the pedal part as well as preventing the foot from slipping into and being held therein. In this way, deficiency in the control of the brake pedal is prevented, enabling reliable control. The portion of the brake arm where it is made thicker is formed integrally with the brake arm, so there is no concern that the portion might deform similar to a guard that is attached separately.

What is claimed is:

1. A brake pedal unit for a saddle riding vehicle having a return spring of a brake arm, a brake stopper, a footboard with the brake arm extending between a rear side and a front side of the vehicle for operating a brake cable, wherein a cross-section of a distal end of the brake arm is formed smaller in size than a pedal part, and a cross-section of a portion of the brake arm projected above from a window hole of the footboard has a shape similar to the pedal part, the brake arm having a distal part extending forward and curved upward and axially supported below the footboard by the vehicle, the brake arm being rotatable about an axis so as to move up and down; the pedal part being fixed to the distal part of the brake arm extending forward and curved upward, wherein the distal part of the brake arm with the pedal part fixed thereto is projected upward through the window hole so as to allow the pedal part to be stepped on and pressed downwards, wherein the return spring of the brake arm, the brake stopper and an end portion of the brake cable are disposed, respectively, below the footboard and between the footboard and a pair of lower tubes constituting a vehicle body frame.

2. The brake pedal unit for a saddle riding vehicle according to claim 1, wherein the portion of the brake arm having a cross-section with a similar shape to the pedal part tapers inwardly in a direction away from the pedal part.

* * * * *